INVENTOR.
Richard C. Balmer
ATTORNEY

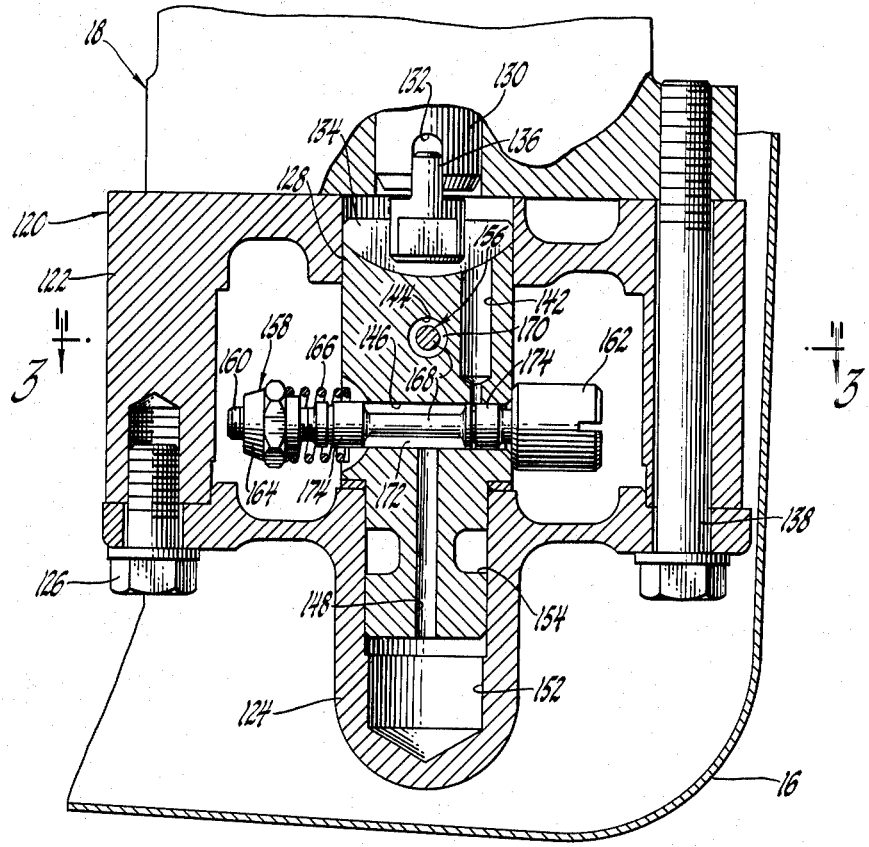

United States Patent Office 3,241,533
Patented Mar. 22, 1966

3,241,533
GOVERNOR SYSTEM
Richard C. Balmer, Pontiac, Mich., assignor to General Motors Corporation, Detroit, Mich., a corporation of Delaware
Filed Sept. 12, 1962, Ser. No. 223,081
6 Claims. (Cl. 123—103)

This invention relates to a governor system for an engine driven vehicle, and more particularly to an hydraulic governor system for a vehicle having two speed ranges of operation.

In the design and operation of many heavy vehicles, such as trucks, it is desirable to have a governor system for the engine to prevent over-speeding by the operator and resultant damage to the engine due to such over-speeding. Engine governors are of many different types, one of which is an hydraulically operated system to control the engine throttle valve in accordance with the pressure of some fluid in the engine system. For example, this fluid may be oil from the usual engine oil pump which generally has a pressure proportional to engine speed.

In many present governor systems, and particularly in systems which are used with vehicles having two speed ranges of operation, a single governor control element is provided to control the engine throttle valve throughout both speed ranges. This presents problems in the different engine speeds that may be required under the various speed ranges, and governing for one speed range may not be sufficient or desirable for the other speed range.

The device in which this invention is embodied comprises, generally, an hydraulic governor control unit operating from the engine oil pump, or other suitable accessory, and which contains two centrifugally unbalanced valve members to control flow through separate passages depending on the speed range of operation. A selector valve is disposed between the governor control unit and the engine throttle valve, the selector valve being actuated in accordance with the device that changes the operation from one speed range to the other. The selector valve provides the proper fluid pressure to the usual slave cylinder mechanically connected to the engine throttle valve.

With a governor system of this nature, engine governing during the different speed ranges of operation may be controlled in accordance with different parameters in an efficient and economical manner. The entire governing system is relatively simple to manufacture, assemble and operate, is located within the confines of the engine to prevent tampering, and is positive in its operation. The unit may be easily adjusted by proper procedures to change the amount or duration of governing and may be adapted to existing engines.

These and other advantages will become more apparent from the following description and drawings, in which:

FIGURE 1 is a partial schematic and partial sectional view of the governing system embodying the invention, with the governor control unit and selector valve in cross-section illustrating the position of the various parts;

FIGURE 3 is a cross-sectional view of the governor control unit taken substantially along the line 3—3 of FIGURE 2 and looking in the direction of the arrows.

Figure 2:
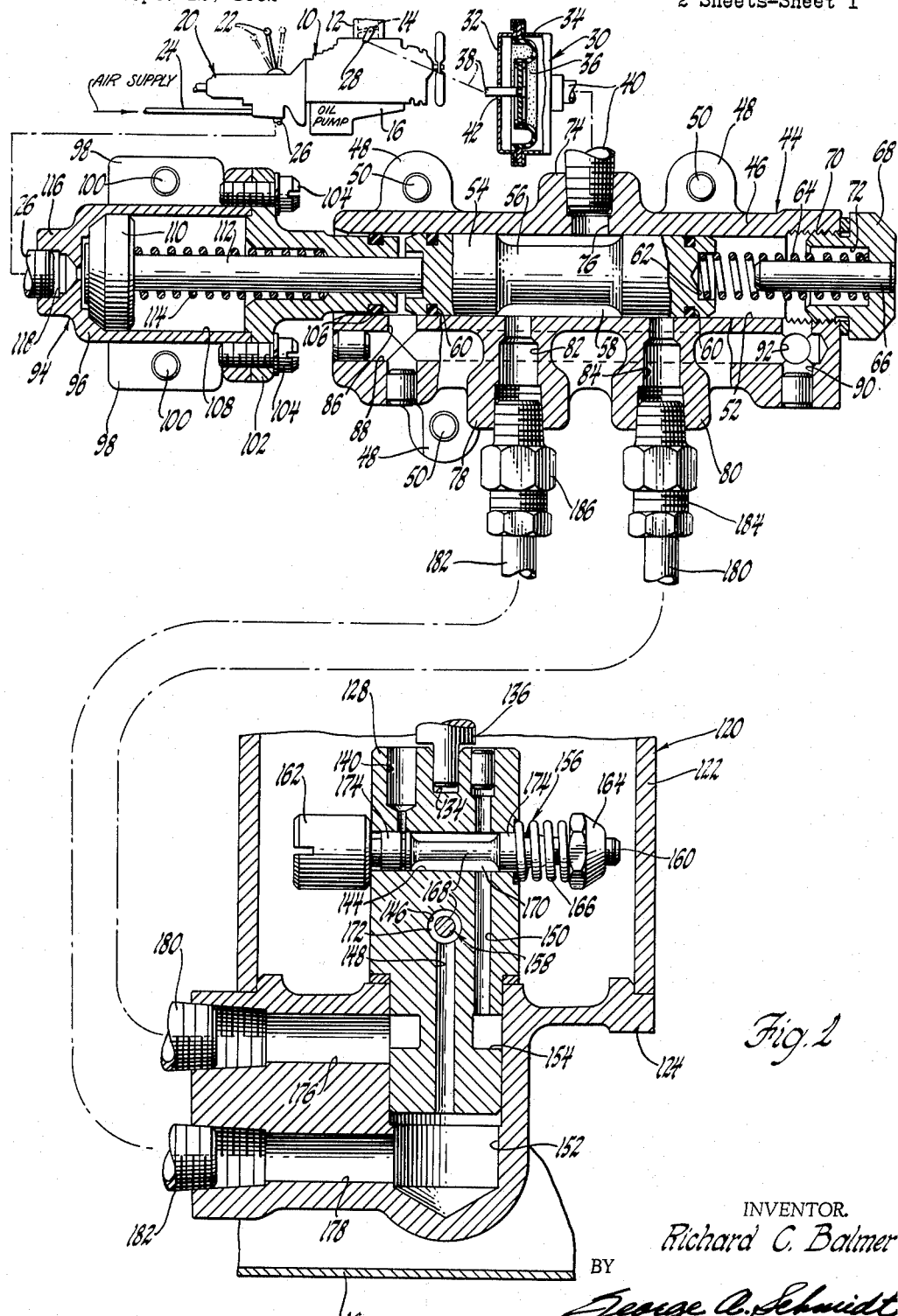
FIGURE 2 is a cross-sectional view of the governor control unit taken along a plane transverse to that of FIGURE 1.

Referring more particularly to the drawings, the overall system is best illustrated in FIGURE 1. A typical internal combustion engine is illustrated generally by the numeral 10 and is shown to include a fuel inlet conduit 12 containing a throttle valve 14. A crankcase 16 is located below the main portion of the engine 10 and has mounted therein a conventional oil pump, illustrated generally by the numeral 18 in FIGURE 2. Extending rearwardly of engine 10 is a suitable transmission and clutch assembly, illustrated generally by the numeral 20, which includes a suitable shifting mechanism, such as shift lever 22. Transmission 20 may have an air supply conduit 24 leading from an air supply source and air outlet conduit 26, the purpose for which will become hereinafter apparent. The air leaves the transmission 20 under certain conditions and in conjunction with the shifting mechanism, such as lever 22.

In order to actuate throttle valve 14 in inlet 12, a suitable link 28 is connected thereto. Link 28 is actuated by a slave cylinder, illustrated generally by the numeral 30, in the usual manner and in conjunction with fluid pressure as will be more fully hereinafter described. Slave cylinder 30 may be formed of housing portions 32 and 34, suitably joined, and a resilient diaphragm 36 is disposed in the housing 32–34. A control rod 38 is attached to the diaphragm 36 and is operatively connected to the link 28 controlling throttle valve 14. An inlet conduit 40 permits the flow of pressurized fluid to one side of the diaphragm 36 and housing portion 32 has an aperture 42 surrounding control rod 38 opening the opposite side of the diaphragm to the atmosphere. This permits free movement of the diaphragm in accordance with pressure on one side thereof.

Mounted in a convenient place adjacent the engine 10 is a selector valve, illustrated generally by the numeral 44. Valve 44 includes a housing 46 with a plurality of mounting ears 48 permitting the valve to be mounted in some convenient spot by means of bolt 50. Housing 46 is provided with a cylindrical passage or bore 52 in which a valve spool 54 is located and in which the valve spool may slide. Valve spool 54 is a cylindrical member having a reduced central portion 56 which provides, with the passage 52, an annular valve chamber 58. Adjacent each end of valve spool 54 is a seal, such as O-rings 60. Valve spool 54 is further provided at one end with the bore 62 to receive a spring 64 biasing the valve spool in a direction such as to the left, as viewed in FIGURE 1. A valve stop 66 is mounted in an end plug 68 which may be adjusted in the passage 52 by means of threads 70. Plug 68 is also provided with a bore 72 to retain the spring 64 in its proper position.

Valve housing 46 has a boss 74 with a bore 76 therein which receives the outlet conduit 40 extending to the slave cylinder 30. Bore 76 communicates with the valve chamber 58 and communication is maintained under all operating positions of the valve spool 54. On the opposite side of valve housing 16 are two bosses 78 and 80 having bores 82 and 84, respectively. Bores 82 and 84 communicate with passage 52 and one or the other is always in communication with the valve chamber 58, as will be more fully hereinafter described. In order to permit free movement of the valve spool 54 air passages 86, 88, 90 and 92 are provided which open the opposite ends of passage 52 to the atmosphere.

Adjacent selector valve 44 is mounted a valve actuating unit 94. Unit 94 includes a housing 96 having mounting ears 98 which may be secured to any suitable structure by bolts 100 to hold the housing 96 in place. Housing 96 is secured to a second housing 102 by means of suitable bolts 104. Housing 102 may extend into the passage 52 in the selector valve 44, and is provided with a seal, such as O-ring 106, to prevent the flow of fluid therepast.

Housing 96 contains a central chamber 108 to receive a piston 110. Piston 110 has a piston rod 112 secured thereto, the piston rod 112 extending through the housing 102 and engaging valve spool 54 in the selector valve 44. A piston spring 114 biases the piston in one direction, such as to the left as viewed in FIGURE 1. Any suitable means may be used to actuate piston 110, including a fluid or a mechanical linkage. However, in many installations an air supply is available. For this reason, housing 96 is provided with a boss 116 having a bore 118 formed therein. Bore 118 receives air conduit 26 extending from the transmission unit 20 and permits air under pressure to enter the housing 96 and actuate piston 110. This will be more fully hereinafter described. Movement of piston 110 will, of course, move valve spool 54 in the direction to the right as viewed in FIGURE 1.

Located in a suitable position in the engine, or adjacent the engine, is a governor control unit illustrated generally by the numeral 120. Unit 120 includes a housing portion 122 and a journal portion 124, secured together in any suitable manner, as by bolt 126. Journaled in the journal portion 124 and enclosed by the housing portion 122 is a rotating shaft 128, adapted to be driven at a speed proportional to engine speed by any suitable engine accessory. For purposes of description and illustration, shaft 128 is shown to be driven by the oil pump shaft 130 mounted in the oil pump 18. Oil pump shaft 130 is provided with a transverse groove 132 and the governor control unit shaft 128 is provided with a groove 134. A suitable drive key 136 is received in each of the aforementioned grooves so that the governor control unit shaft 128 will be positively driven by the oil pump shaft 130. The governor control unit 120 may be secured to the housing of oil pump 18 in any suitable manner, as by bolt 138. The entire assembly may be mounted within the crankcase 16 of the engine 10 to prevent unauthorized access thereto.

Governor control unit shaft 128 is provided with two longitudinal inlet bores 140 and 142. These passages lead to transverse bores 144 and 146, respectively, and longitudinal passages 148 and 150, respectively, lead from cross bores 144 and 146. Journal portion 124 is provided with a chamber 152 directly below the shaft 128 and into which longitudinal passage 148 opens, and shaft 128 is provided with an annular groove 154 which communicates with the longitudinal passage 150. Thus, two separate passages lead through the shaft 128.

Disposed in each of the cross bores 144 and 146 is a centrifugally unbalanced speed responsive valve member, indicated generally by the numerals 156 and 158, respectively. Each of these valve members is substantially the same and further reference numerals are applied to equivalent structural parts. A valve stem 160 is provided for each of the valve members and at one end has a predetermined mass 162, adapted to move outwardly and carry the stem 160 in the cross bore under centrifugal force as shaft 128 is rotated. Valve stem 160 is provided with an adjusting nut 164 and biasing spring 166 at the opposite end thereof to normally maintain the valve stem in the position shown in FIGURES 1–3. This position normally closes the passages, as will become hereinafter more apparent.

The central portion 168 of each valve stem 160 is reduced in diameter to provide valve chambers 170 and 172 with the cross bores 144 and 146, respectively. Portions 174 of the valve stems 160 close the longitudinal inlets 140 and 142 under normal conditions, and as predetermined rotational speeds are reached the masses 162 fly outwardly, moving the valve members to the left as viewed in FIGURE 1, and to the right as viewed in FIGURE 2. When this happens, communication is established between longitudinal passages 140 and 150 and longitudinal passages 142 and 148. The opening may be gradual, or the opening may be abrupt, depending on the predetermined weight of the masses 162 and the type of governing control desired.

The housing journal portion 124 of governor control unit 120 is provided with bores 176 and 178. Bore 176 communicates with the annular groove 154 in shaft 128 and thus with longitudinal passage 150 in the shaft 128. Bore 178 communicates with the chamber 152 formed in the housing journal portion 124 and thus with longitudinal passage 148. Received in bores 176 and 178 are outlet conduits 180 and 182, respectively, which extend to and are secured in bosses 80 and 78, respectively, in the housing 46 of selector valve 44. Suitable conduit fittings 184 and 186 may be provided where necessary.

It is thus apparent that two separate circuits are provided between the oil pump 18 and the slave cylinder 30 operating the throttle valve 14. One passage includes the inlet passage 140 in the governor control unit shaft 128, the valve chamber 170 in the cross bore 144, the longitudinal passage 150 in the shaft 128, the annular groove 154 in the shaft 128, the outlet bore 176 in the housing journal portion 124, conduit 180 in the housing journal portion 124, bore 84 in the selector valve 44, valve chamber 58 in the selector valve 44, when the valve spool 54 is properly positioned, and conduit 40 leading to the pressure side of slave cylinder 30. The second circuit includes longitudinal inlet 142 in the governor control shaft 128, valve chamber 172 in cross bore 146, longitudinal passage 148, the chamber 152 in the housing journal portion 124, outlet bore 178 in the housing journal portion 124, outlet conduit 182, bore 82 in boss 78 of the selector valve housing 46, valve chamber 58 in the housing 46, when the valve spool 54 is properly positioned, outlet bore 76 and conduit 40 leading to the pressure side of the slave cylinder 30. One or the other of these circuits conveys a fluid under pressure to the slave cylinder at one or the other of the speed ranges of the vehicle in order to provide the proper governing control. The pressurized fluid may be oil from the oil pump leading to the upper portion of the shaft 128 in the governor control unit 120 in any suitable manner. Oil pressure is desirable since it is generally available, although the source of the pressurized fluid need not be restricted to the oil pump. Any suitable source is satisfactory so long as the pressure thereof has some relation to the engine speed.

The operation of the above described construction, with respect to a situation where the vehicle operator has two alternatives as to axle speed range, is as follows. These may be labeled HI and LO for puposes of illustration. The transmission control lever 22 may be assumed to be in position A at HI speed and in position B at LO speed. Assuming first that the speed range is in the LO position and that the selector valve 44 and operating piston 110 are in the position shown in FIGURE 1, the engine is freely operated through the nongoverned speed range. As the engine speed approaches a predetermined value, the value at which governing is required, mass 162 of the centrifugally unbalanced valve 158 in the governor control unit 120 begins to move outwardly in response to centrifugal force caused by the rotating shaft 128. This opens the communication between longitudinal passages 142 and 148 in the rotating shaft 128, permitting the flow of oil under pressure through the conduit 182 and into valve chamber 58 in the selector valve housing 46. From the valve chamber 58 the oil under pressure flows to the slave cylinder 30 forcing the diaphragm 136 to the left to close the throttle valve 14 in the fuel inlet 12, a suitable amount. Thus, governing is accomplished.

If the operator is now to shift from the LO range to the HI range, air under pressure from the air supply flows through conduit 26 to force piston 110 to the right as viewed in FIGURE 1, thus pushing valve stem 54 to the right. Bore 82 is closed and bore 84 is opened into the valve chamber 58. Under these conditions, centrifugally unbalanced valve 156 opens as governing is desired to open the other circuit of fluid flow to the valve chamber through conduit 182 and thence to slave cylinder 30. Governing is thus accomplished at the HI speed range of operation.

It is apparent from FIGURE 1 and from the above description of operation that the piston 110, actuating the valve 54, is normally biased into the LO speed range condition by the spring 114. Thus, air pressure through conduit 126 is required when shifting to the HI speed range of operation. This procedure could be reversed so that at LO speed air under pressure would be required to move the piston 110. Then, the piston spring 114 would bias the piston 110 into the opposite position during the HI speed range of operation. However, the preferred form is as illustrated in the drawings and as above described. With this construction it is apparent that a failure in air supply would maintain governing under the LO speed range of operation and the engine would be governed only at the lower speed.

Thus, a two-speed engine governing control system is provided which is positive in its operation and is relatively simple to manufacture and assemble. The various ranges of governing control may be varied by changing the weight of the masses on the centrifugally unbalanced valve members to provide different governing speeds for the different operational ranges. The control may be actuated by any suitable fluid pressure, so long as the pressure is proportional or bears some relation to engine speed, and available engine accessories, such as the engine oil pump, may be utilized for the drive mechanism. This permits the governor control system to be installed on existing engines and in existing vehicles without extensive modification thereof.

What is claimed is:

1. A hydraulic governor control system for an engine having a throttle valve and having associated therewith a hydraulic pressure source and position selecting means, said system being adapted to control the maximum speed of the engine at one of two predetermined values and comprising:

a governor element having first and second outlet means adapted to be communicated with the hydraulic pressure source, said governor element having first and second centrifugally unbalanced valve members controlling the communication of the first and second outlet means respectively with the hydraulic pressure source, each of the valve members being adjustably operable to open such communication when the engine is operated above respectively predetermined speeds;

a selector valve having a cylindrical bore therein and a valve member reciprocably positionable in the bore in response to movement of the position selecting means, said valve member cooperating with the bore to define an annular valve chamber;

hydraulic means communicating with the valve chamber and operatively connected with the throttle valve; and a pair of outlet conduits extending between the governor element outlet means and the selector valve, said valve member being adapted to alternatively communicate one of the outlet conduits with the annular valve chamber and to close the other of the outlet conduits.

2. A two-speed control system for an internal combustion engine having a throttle valve, an accessory adapted to be driven at a speed proportional to the speed of the engine, throttle valve operating means and external position selecting means, said system comprising:

a selector valve hydraulically connected with the throttle valve operating means and having a valve chamber therein, a valve member partially defining the chamber and reciprocably positionable in response to movement of the external position selecting means, said valve member being resiliently biased in one direction and pneumatically actuated in the other direction;

a governor element having a shaft operatively connected to the accessory and rotatable therewith at a speed proportional to the speed of the engine, said governor element including a housing having a shaft journaled therein and rotatable by the accessory, said shaft having first and second longitudinal passages formed therein and first and second speed responsive valves closing the first and second longitudinal passages respectively, said speed responsive valves being operable to open the passages when the shaft is rotated above predetermined speeds, and said housing having outlet means therein communicating with the longitudinal passages in the shaft;

and first and second outlet conduits extending between the governor element outlet means and the selector valve, said valve member being adapted to alternatively communicate one of the outlet conduits with the valve chamber and to simultaneously close communication of the valve chamber with the other of the outlet conduits.

3. A governor control unit for an engine having an accessory driven at a speed proportional to the speed of the engine and comprising:

a housing adapted to be mounted adjacent the accessory and having a chamber formed therein;

a shaft journaled in the housing and adapted to be operatively connected to and rotatable with the accessory, said shaft having an annular groove adjacent the end thereof and having first and second longitudinal passages formed therein, the first longitudinal passage communicating with the annular groove and the second longitudinal passage communicating with the chamber;

first and second centrifugally unbalanced valve members in the shaft and closing the first and second longitudinal passages respectively, said valve members being operable to open the passages when the shaft is rotated above predetermined speeds; and first and second outlet means in the housing and communicating with the annular groove and the chamber respectively, said outlet means being adapted to communicate with the engine to permit governing thereof.

4. A governor control unit for an engine having a hydraulic governor control system including hydraulic throttle actuating means and a hydraulic pressure source, said governor control unit comprising:

a housing having a chamber formed therein;

a shaft rotatably journaled in the housing and having an end partially defining the chamber, said shaft having an annular groove spaced from the end and having first and second longitudinal passages formed therein, the first longitudinal passage communicating with the annular groove and the second longitudinal passage communicating with the chamber, said passages being adapted to communicate with the hydraulic pressure source;

first and second centrifugally unbalanced valve members in the shaft and closing the first and second longitudinal passages respectively whereby to cut off communication with the hydraulic pressure source, each of the valve members being individually adjustably operable to open the passages when the shaft is rotated above respectively predetermined speeds; and first and second outlet means in the housing and communicating with the annular groove and the chamber respectively, whereby, upon rotation of the shaft above a first predetermined speed, the first outlet means is adapted to be communicated with the hydraulic pressure source and upon rotation of the shaft above a second predetermined speed, the second outlet means is adapted to be communicated with the hydraulic pressure source, said outlet means being adapted to communicate with the hydraulic throttle actuating means to permit the governing of the engine.

5. A selector valve for an engine hydraulic governor control system, said engine having a throttle valve and an oil pressure source and said control system including hydraulic means operatively connected to actuate the throttle valve, a governor control unit having first and second outlet means adapted to be communicated with the oil pressure source at engine speeds above individually predetermined first and second engine speeds respectively, a pneumatic pressure source and control means for controlling the flow of fluid from the pneumatic pressure source, said selector valve comprising:

a housing having a cylindrical bore extending longitudinally therethrough;

a valve spool reciprocably disposed in the bore and cooperating therewith to form an annular valve chamber, said valve spool and annular valve chamber being reciprocable in the bore to first and second positions;

outlet means in the housing and adapted to be connected with the hydraulic means, said outlet means communicating at all times with the annular valve chamber;

first and second inlet means in the housing opening into the cylindrical bore and adapted to be connected with the first and second outlet means respectively of the governor control unit, said first inlet means being communicated with the valve chamber in the first position of the valve spool and said second inlet means being communicated with the valve chamber in the second position of the valve spool, the location of the valve spool in one of the first and second positions being operative to communicate the hydraulic means with a corresponding one of the first and second governor outlet means.

6. A selector valve as defined in claim 5 and further comprising:

resilient means in the housing and biasing the valve spool toward the first position;

pneumatic motor means closing one end of the bore and engaging the valve spool, said motor means being adapted to communicate with the pneumatic pressure control means and to respond to a flow of pressure fluid therefrom to actuate the valve spool from the first position to the second position;

stop means closing the other end of the bore and locating the valve spool in the second position;

and air passages communicating with the bore on opposite ends of the valve spool and open to atmosphere to permit the free movement of air to and from the bore ends upon movement of the valve spool from one position to the other.

References Cited by the Examiner

UNITED STATES PATENTS

| | | | |
|---|---|---|---|
| 2,362,655 | 11/1944 | Mallory | 74—472.1 |
| 2,377,256 | 5/1945 | Mallory | 74—472.1 X |
| 2,474,316 | 6/1949 | May et al. | 74—472.1 |
| 2,533,231 | 12/1950 | Drake et al. | 137—34 |
| 2,603,472 | 7/1952 | Adler | 137—34 |
| 2,875,635 | 3/1959 | Fleck et al. | 74—472.1 |
| 2,925,156 | 2/1960 | Grant et al. | 74—472.1 X |

DON A. WAITE, *Primary Examiner.*